United States Patent
Wang et al.

(10) Patent No.: US 8,807,815 B2
(45) Date of Patent: Aug. 19, 2014

(54) LIGHT SOURCE STRUCTURE FOR OPTICAL FIBER DISPLAY DEVICE AND OPTICAL FIBER DISPLAY DEVICE

(71) Applicant: Boe Technology Group Co., Ltd., Beijing (CN)

(72) Inventors: Yingtao Wang, Beijing (CN); Jaegeon You, Beijing (CN); Jikai Yao, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 0 days.

(21) Appl. No.: 13/946,041

(22) Filed: Jul. 19, 2013

(65) Prior Publication Data

US 2014/0063840 A1 Mar. 6, 2014

(30) Foreign Application Priority Data

Aug. 31, 2012 (CN) .......................... 2012 1 0320658

(51) Int. Cl.
*F21V 9/08* (2006.01)
*F21V 7/00* (2006.01)
*F21V 8/00* (2006.01)

(52) U.S. Cl.
USPC .............................. 362/583; 362/310; 362/560

(58) Field of Classification Search
CPC ................... G01N 2021/432; F21V 2008/008; H01J 29/892
See application file for complete search history.

(56) References Cited

U.S. PATENT DOCUMENTS

| 5,207,106 A * | 5/1993 | Schwider et al. ................ 73/828 |
| 2005/0156749 A1* | 7/2005 | Martinez ....................... 340/641 |
| 2012/0195578 A1* | 8/2012 | Mehring ........................... 396/4 |

FOREIGN PATENT DOCUMENTS

CN 1584647 A 2/2005

OTHER PUBLICATIONS

First Chinese Office Action dated Mar. 6, 2014; Appln. No. 201210320658.1.

* cited by examiner

*Primary Examiner* — Tracie Y Green
(74) *Attorney, Agent, or Firm* — Ladas & Parry LLP

(57) ABSTRACT

Embodiments of the present invention provide a light source structure for optical fiber display device and an optical fiber display device. The light source structure for optical fiber display device comprises a light source. The light source structure for optical fiber display device is of a hollow truncated cone structure, a upper surface, a side surface and a lower surface of the hollow truncated cone structure are constituted by the light source, a reflection cover and an optical fiber connection surface, respectively, a light emitting surface of the light source is disposed to face the optical fiber connection surface, a reflection surface of the reflection cover is provided inside the hollow truncated cone structure, and the optical fiber connection surface has an optical fiber connection region that corresponds to the position of the light source and has a same size as the light source.

9 Claims, 1 Drawing Sheet

LIGHT SOURCE STRUCTURE FOR OPTICAL FIBER DISPLAY DEVICE AND OPTICAL FIBER DISPLAY DEVICE

FIELD OF THE INVENTION

Embodiments of the present invention relate to a light source structure for optical fiber display device and an optical fiber display device.

BACKGROUND

A conventional optical fiber display device comprises a display panel, a plurality of optical fibers provided on the display panel, and a light source structure provided on a side of the light incident surfaces of the optical fibers. Since the distance between the light source structure and the light incident surface of the optical fiber is relatively long, the majority of the light emitted from the light source structure can not perpendicularly reaches and enters into the light incident surface of the optical fiber, and in this case, it is difficult to satisfy the current demand for displaying images with high brightness and high definition. In addition, the light source structure conventionally used is only constituted by an incandescent bulb, and in this case, the display effect will be adversely influenced when the display panel is made larger. Furthermore, the conventional optical fiber display device achieves the color display mainly by applying color coating material on a light exit end of the optical fiber, and in this case, it is hard to achieve the color display of image clearly.

SUMMARY OF THE INVENTION

According to an embodiment of the present invention, there is provided a light source structure for optical fiber display device. The light source structure for optical fiber display device comprises a light source. The light source structure for optical fiber display device is of a hollow truncated cone structure, a upper surface, a side surface and a lower surface of the hollow truncated cone structure are constituted by the light source, a reflection cover and an optical fiber connection surface, respectively, a light emitting surface of the light source is disposed to face the optical fiber connection surface, a reflection surface of the reflection cover is provided inside the hollow truncated cone structure, and the optical fiber connection surface has an optical fiber connection region that corresponds to the position of the light source and has a same size as the light source.

According to another embodiment of the present invention, there is provided an optical fiber display device. The optical fiber display device comprises:
- a light source structure comprising a light source, wherein the light source structure is of a hollow truncated cone structure, a upper surface, a side surface and a lower surface of the hollow truncated cone structure are constituted by the light source, a reflection cover and an optical fiber connection surface, respectively, a light emitting surface of the light source is disposed to face the optical fiber connection surface, a reflection surface of the reflection cover is provided inside the hollow truncated cone structure, and the optical fiber connection surface has an optical fiber connection region that corresponds to the position of the light source and has a same size as the light source;
- an optical fiber having a light incident surface and a light emitting surface, wherein the light incident surface of the optical fiber is connected to the optical fiber connection region of the light source structure, and a normal direction of the light incident surface is perpendicular to the optical fiber connection surface;
- a display panel connecting with the light emitting surface of the optical fiber and used to display an image.

DESCRIPTION OF THE EMBODIMENTS

In order to make objects, technical solutions and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiment 1

Figure 1:
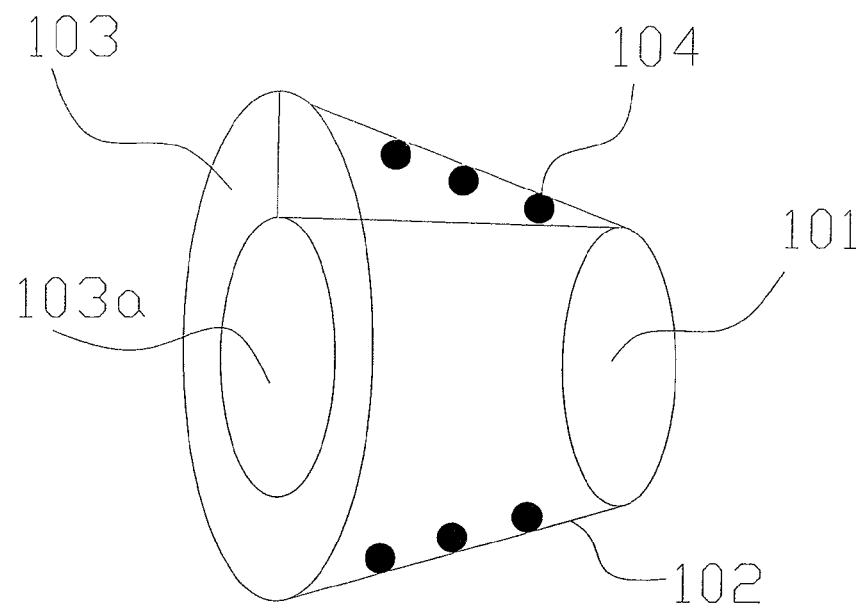
FIG. 1 is a structural schematic view of a light source structure for optical fiber display device according to embodiment 1 of the present invention.

As shown in FIG. 1, the light source structure 1 for optical fiber display device according to this embodiment comprises a circle light source 101. The light source structure 1 for optical fiber display device is of a hollow truncated cone structure. An upper surface, a side surface and a lower surface of the hollow truncated cone structure are constituted by the light source 101, a reflection cover 102 and an optical fiber connection surface 103, respectively. A light emitting surface of the light source 101 is disposed to face the optical fiber connection face 103. A reflection surface of the reflection cover 102 is provided inside the hollow truncated cone structure. The optical fiber connection surface 103 has an optical fiber connection region 103a that corresponds to the position of the light source 101 and has a same size as the light source 101.

In this embodiment, a polymer with high reflectivity is provided on the reflection surface of the reflection cover 102. This polymer is used to reflect the light emitted from the light source and irradiated to the reflection surface with high reflectivity to the optical fiber connection region 103a so as to increase the utilization efficiency of the light emitted from the light source.

In this embodiment, for example, the polymer with high reflectivity is polymethyl methacrylate (PMMA) 104.

By using the light source structure for optical fiber display device according to this embodiment, the majority of the light emitted from the light source can perpendicularly reach and enter into the light incident surface of the optical fiber, and thus the light emitted from the light source can be utilized efficiently, and a more clear display can be performed on the display panel.

Compared with the conventional light source structure constituted only by incandescent bulb or LED, the light source structure for optical fiber display device according to this embodiment can replace the light source more easily, and thus the cost can be greatly reduce. Furthermore, compared with the conventional light source structure constituted only by incandescent bulb or LED, the light source structure for optical fiber display device according to this embodiment can be applied to large-sized displays.

Embodiment 2

Figure 2:
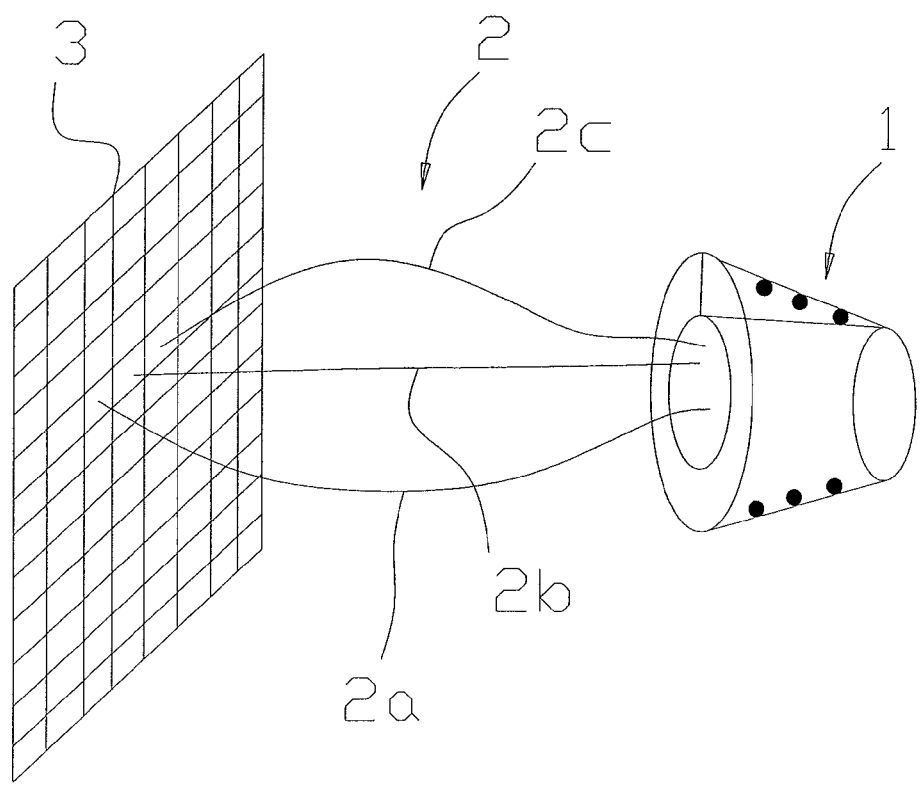
FIG. 2 is a structural schematic view of an optical fiber display device according to embodiment 2 of the present invention.

As shown in FIG. 2, an optical fiber display device according to this embodiment comprises:
the light source structure 1 for optical fiber display device according to embodiment 1;
an optical fiber 2 having a light incident surface and a light emitting surface, wherein the light incident surface of the optical fiber 2 is connected to the optical fiber connection region 103a of the light source structure 1 for optical fiber display device, and a normal direction of the light incident surface is perpendicular to the optical fiber connection surface 103;
a display panel 3 connecting with the light emitting surface of the optical fiber 2 and used to display an image.

In this embodiment, for example, the light incident surface and the light emitting surface of the optical fiber 2 are of hemispherical shape.

In this embodiment, the display panel 3 comprises a color filter layer. For example, the color filter layer is as same as a color filter layer used in a conventional liquid crystal display device. The color filter layer is provided with three sub-pixels of R (red), G (green) and B (blue) to correspond to each display pixel of the display panel.

In this embodiment, each of the R sub-pixel, G sub-pixel and B sub-pixel of the color filter layer is connected with the light emitting surface of one optical fiber 2. FIG. 2 shows three optical fibers 2a, 2b and 2c respectively connecting with the R sub-pixel, the G sub-pixel and the B sub-pixel of the color filter layer.

In this embodiment, since the optical fibers 2a, 2b and 2c are respectively connected with the R sub-pixel, the G sub-pixel and the B sub-pixel of the color filter layer, it is possible to achieve a more clear color display on the optical fiber display device.

In this embodiment, the display panel of the optical fiber display device may be made into different shapes, or may be of an uneven structure, or may be designed according to the practical requirements of the user.

Since light propagation in the optical fiber is implemented by total reflection, it is possible to reduce the loss of light by controlling the propagation of light by the optical fiber, and thus the optical fiber display device can have high brightness and high clearness. In addition, since the speed of the light propagating in the optical fiber is extremely fast, the response time of the optical fiber display device can be very short, almost be close to zero.

In this embodiment, the majority of the light emitted from the light source can perpendicularly reach and enter into the light incident surface of the optical fiber due to the use of the light source structure, and thus the light emitted from the light source can be utilized efficiently, and a more clear display can be performed on the display panel.

The foregoing embodiments merely are exemplary embodiments of the invention, and not intended to define the scope of the invention, and the scope of the invention is determined by the appended claims.

What is claimed is:

1. A light source structure for optical fiber display device comprising a light source, wherein the light source structure for optical fiber display device is of a hollow truncated cone structure, a upper surface, a side surface and a lower surface of the hollow truncated cone structure are constituted by the light source, a reflection cover and an optical fiber connection surface, respectively, a light emitting surface of the light source is disposed to face the optical fiber connection surface, a reflection surface of the reflection cover is provided inside the hollow truncated cone structure, and the optical fiber connection surface has an optical fiber connection region that corresponds to the position of the light source and has a same size as the light source.

2. The light source structure for optical fiber display device according to claim 1, wherein a polymer with high reflectivity is provided on the reflection surface of the reflection cover.

3. The light source structure for optical fiber display device according to claim 2, wherein the polymer with high reflectivity is polymethyl methacrylate.

4. An optical fiber display device, comprising:
a light source structure comprising a light source, wherein the light source structure is of a hollow truncated cone structure, a upper surface, a side surface and a lower surface of the hollow truncated cone structure are constituted by the light source, a reflection cover and an optical fiber connection surface, respectively, a light emitting surface of the light source is disposed to face the optical fiber connection surface, a reflection surface of the reflection cover is provided inside the hollow truncated cone structure, and the optical fiber connection surface has an optical fiber connection region that corresponds to the position of the light source and has a same size as the light source;
an optical fiber having a light incident surface and a light emitting surface, wherein the light incident surface of the optical fiber is connected to the optical fiber connection region of the light source structure, and a normal direction of the light incident surface is perpendicular to the optical fiber connection surface;
a display panel connecting with the light emitting surface of the optical fiber and used to display an image.

5. The optical fiber display device according to claim 4, wherein the light incident surface and the light emitting surface of the optical fiber are of hemispherical shape.

6. The optical fiber display device according to claim 4, wherein the display panel comprises a color filter layer, the color filter layer is provided with three sub-pixels of R (red), G (green) and B (blue) to correspond to each display pixel of the display panel.

7. The optical fiber display device according to claim 6, wherein each of the R sub-pixel, G sub-pixel and B sub-pixel of the color filter layer is connected with the light emitting surface of one optical fiber.

8. The optical fiber display device according to claim 4, wherein a polymer with high reflectivity is provided on the reflection surface of the reflection cover.

9. The optical fiber display device according to claim 4, wherein the polymer with high reflectivity is polymethyl methacrylate.

* * * * *